United States Patent
Jones et al.

(10) Patent No.: US 7,468,597 B2
(45) Date of Patent: Dec. 23, 2008

(54) APPARATUS AND METHOD TO PROVIDE POWER TO BATTERY-BACKUP ASSEMBLIES DISPOSED IN AN INFORMATION STORAGE AND RETRIEVAL SYSTEM

(75) Inventors: Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 10/994,066

(22) Filed: Nov. 18, 2004

(65) Prior Publication Data

US 2006/0103997 A1    May 18, 2006

(51) Int. Cl.
*H02J 7/00* (2006.01)
*G06F 12/00* (2006.01)

(52) U.S. Cl. ........................... 320/116; 711/113
(58) Field of Classification Search ................. 320/166, 320/116; 711/113
See application file for complete search history.

(56) References Cited

U.S. PATENT DOCUMENTS

| | | | |
|---|---|---|---|
| 5,187,425 A | 2/1993 | Tanikawa | |
| 5,254,930 A | 10/1993 | Daly | |
| 422,558 A * | 6/1995 | Stewart | 320/120 |
| 5,563,576 A | 10/1996 | Drori et al. | |
| 6,239,578 B1 | 5/2001 | Schnell | |
| 6,377,028 B1 | 4/2002 | Armstrong, II et al. | |
| 6,438,647 B1 * | 8/2002 | Nielson et al. | 711/113 |
| 6,664,000 B1 | 12/2003 | Sonobe | |

\* cited by examiner

*Primary Examiner*—Gary L Laxton
*Assistant Examiner*—Yalkew Fantu
(74) *Attorney, Agent, or Firm*—Dale F. Regelman; Quarles & Brady LLP

(57) ABSTRACT

A method is disclosed to supply power to one or more battery-backup assemblies. The method supplies a first controller, a second controller, a first battery-backup assembly, and a second battery-backup assembly. The method further supplies a power bus interconnected to the first controller, the second controller, the first battery-backup assembly, and the second battery-backup assembly, and a first power supply and a second power supply interconnected with the power bus. The method provides power to the first controller and to the second controller and to the first battery-backup assembly over a first period of time, and provides power to the first controller and to the second controller and to the second battery-backup assembly over a second period of time, where the first period of time differs from the second period of time.

12 Claims, 9 Drawing Sheets

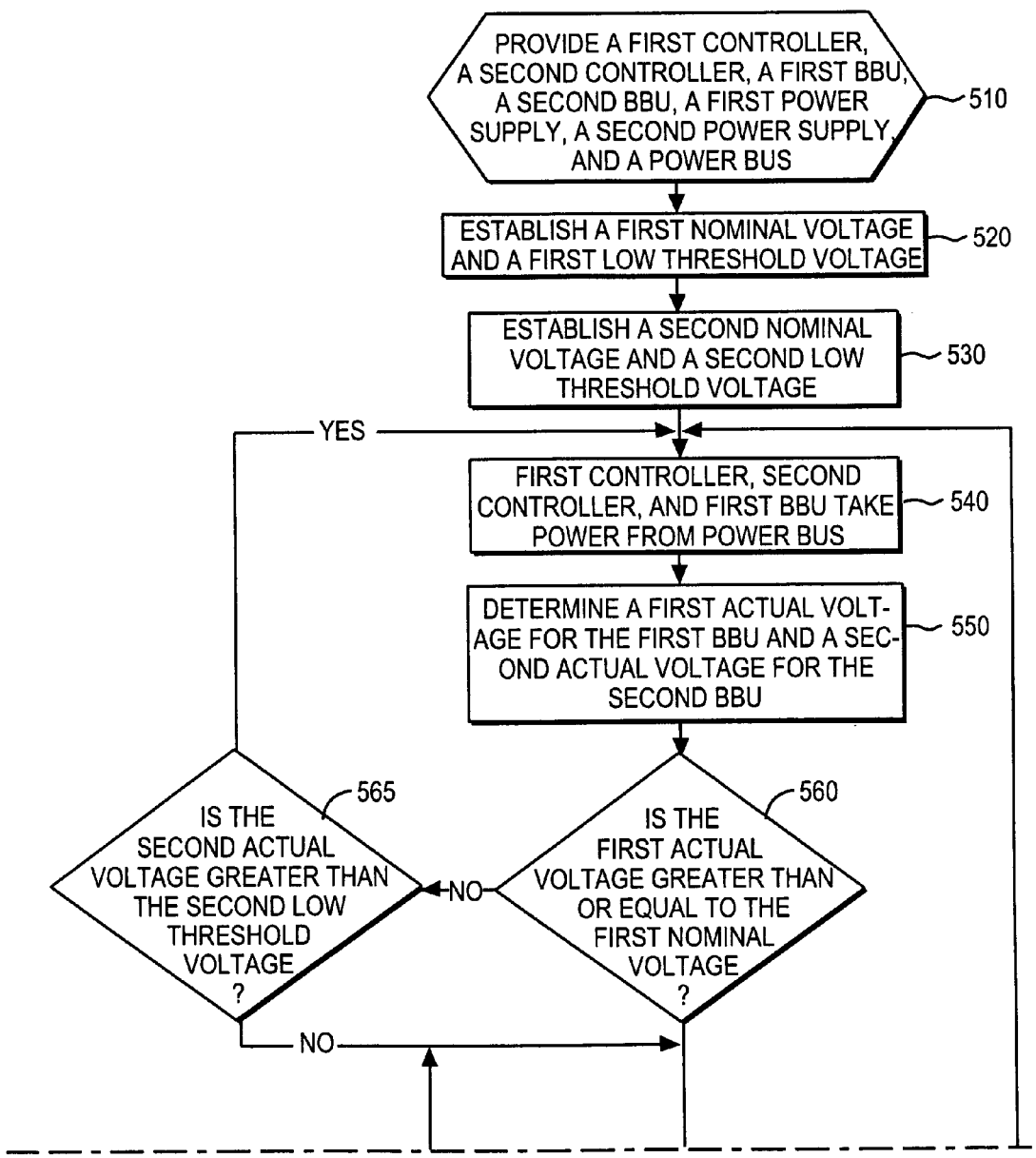

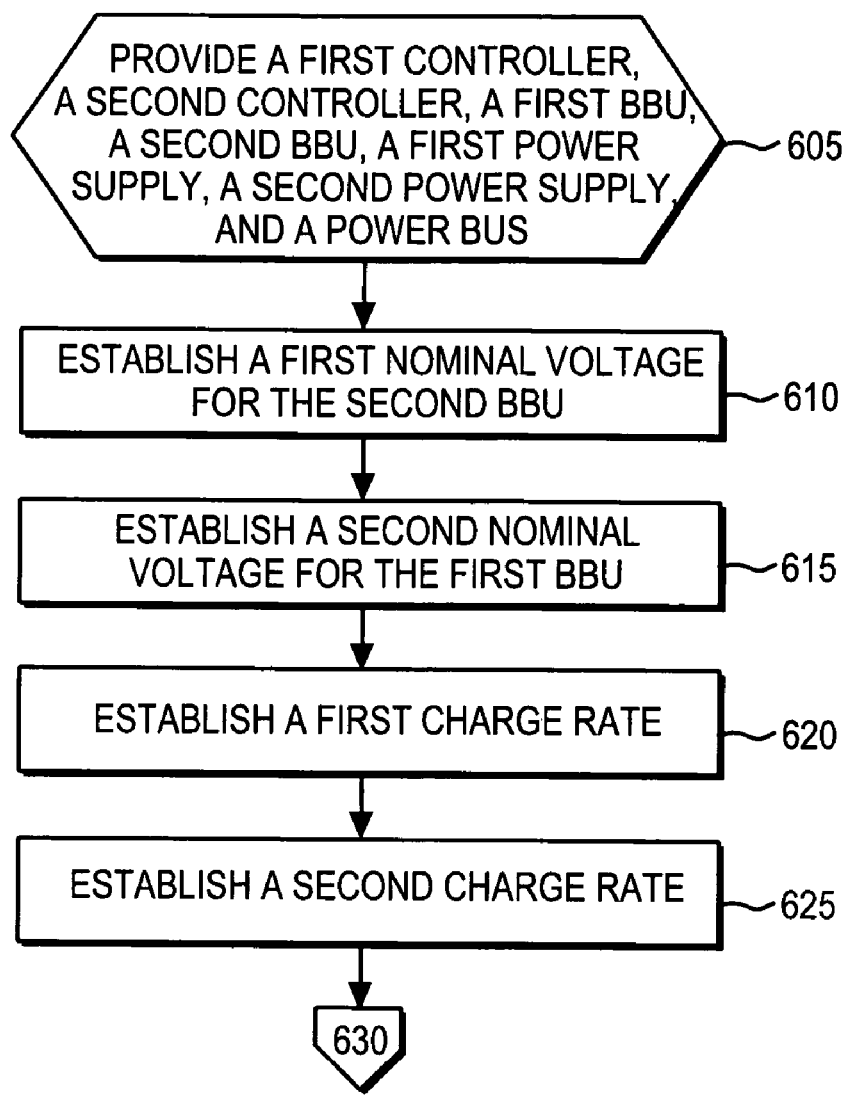

APPARATUS AND METHOD TO PROVIDE POWER TO BATTERY-BACKUP ASSEMBLIES DISPOSED IN AN INFORMATION STORAGE AND RETRIEVAL SYSTEM

FIELD OF THE INVENTION

This invention relates to an apparatus and method to provide power to battery-backup assemblies disposed in an information storage and retrieval system.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

One or more controllers coordinate receipt of information from one or more host computers, and the movement of information to and from the data cache and storage devices. Those one or more controllers are powered by one or more internal power buses. In addition, those one or more controllers are each interconnected with a battery-backup assembly. What is needed is an apparatus and method to selectively provide power to a plurality of battery-backup assemblies.

SUMMARY OF THE INVENTION

Applicants' invention comprises an apparatus and method to supply power to one or more battery-backup assemblies disposed in an information storage and retrieval system. The method supplies a first controller having one or more host adapters, one or more device adapters, a processor, cache, memory, and a Fibre Channel switch, and a first controller load, a second controller having comprising one or more host adapters, one or more device adapters, a processor, cache, memory, and a Fibre Channel switch, and a second controller load, a first battery-backup assembly having a first Battery Backup Unit (BBU) load, where the first battery-backup assembly is external to and interconnected with the first controller, and a second battery-backup assembly having a second BBU load, where the second battery-backup assembly is external to and interconnected with the second controller.

The method further supplies a power bus interconnected to the first controller, the second controller, the first battery-backup assembly, and the second battery-backup assembly. The method further supplies a first power supply and a second power supply interconnected with the power bus, and provides power to the power bus from the first power supply and from the second power supply. The method provides power to the first controller and to the second controller and to the first battery-backup assembly over a first period of time, and provides power to the first controller and to the second controller and to the second battery-backup assembly over a second period of time, where the first period of time differs from the second period of time.

BRIEF DESCRIPTION OF THE DRAWINGS

The invention will be better understood from a reading of the following detailed description taken in conjunction with the drawings in which like reference designators are used to designate like elements, and in which:

FIG. 5A is a flow chart summarizing the steps of a second embodiment of Applicants' method;

FIG. 6A is a flow chart summarizing certain steps of a third embodiment of Applicants' method.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicants' method to control the sequencing of charging of battery back-up systems is not meant, however, to limit Applicants' invention to data processing applications, as the invention herein can be applied to setting and adjusting network speeds in general.

Figure 1:
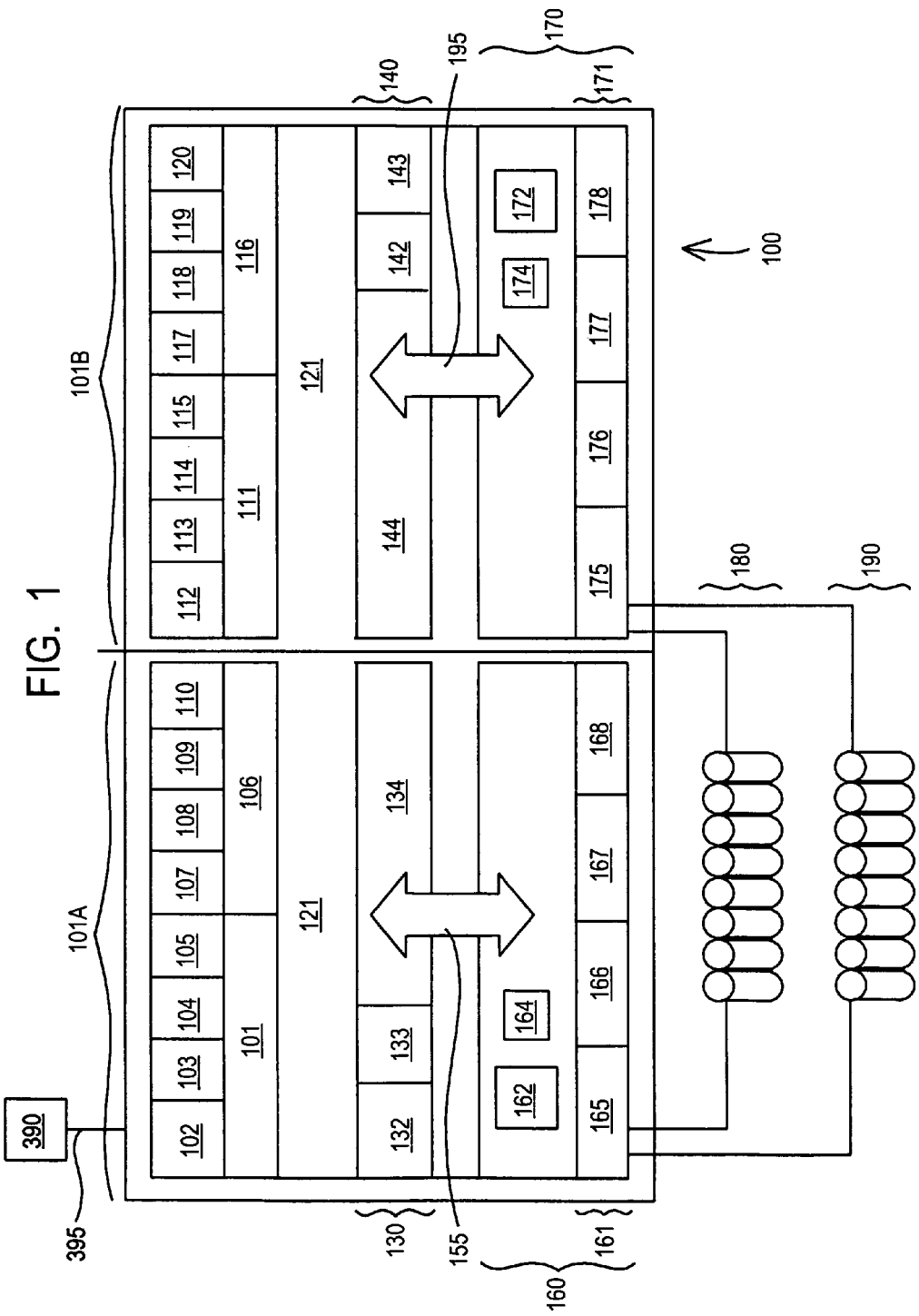
FIG. 1 is a block diagram showing one embodiment of Applicants' information storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapters 101A which includes adapters 102-105 and 107-110; and a second plurality of host adapters 101B which includes adapters 112-115 and 117-120. In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprises nonvolatile storage ("NVS") 162 and battery-backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery-backup 174 for NVS 172.

In certain embodiments of Applicants' system, one or more host adapters, processor portion 130, and one or more device adapters, are packaged together on a single card, such as controller 210 (FIG. 2) disposed in Applicants' information storage and retrieval system. Similarly, in certain embodiments, one or more host adapters, processor portion 140, and one or more device adapters, are disposed on a second card, such as controller 250, disposed in Applicants' information storage and retrieval system. In these embodiments, Applicants' system 100 includes two controllers, such as controllers 210 and 250.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the arrays are not configured according to RAID. In still other embodiments, arrays 180 and 190 comprise what is sometimes called a SBOD array, i.e. "Switched Bunch Of Disks" where the arrays are not configured according to RAID.

The illustrated embodiment of FIG. 1 shows two storage device arrays. In other embodiments, Applicants' system includes a single storage device array. In yet other embodiments, Applicants' system includes more than two storage device arrays.

In certain embodiments Applicants' information storage and retrieval system includes two controllers, two battery-backup assemblies ("BBUs"), and two power supplies. In the illustrated embodiment of FIG. 2, controller 210 comprises one or more host adapters 101, one or more device adapters 161, control portion 130, and Fibre Channel switch 212. In the illustrated embodiment of FIG. 2, controller 250 comprises one or more host adapters 111, one or more device adapters 171, control portion 140, and Fibre Channel switch 252.

Figure 2:
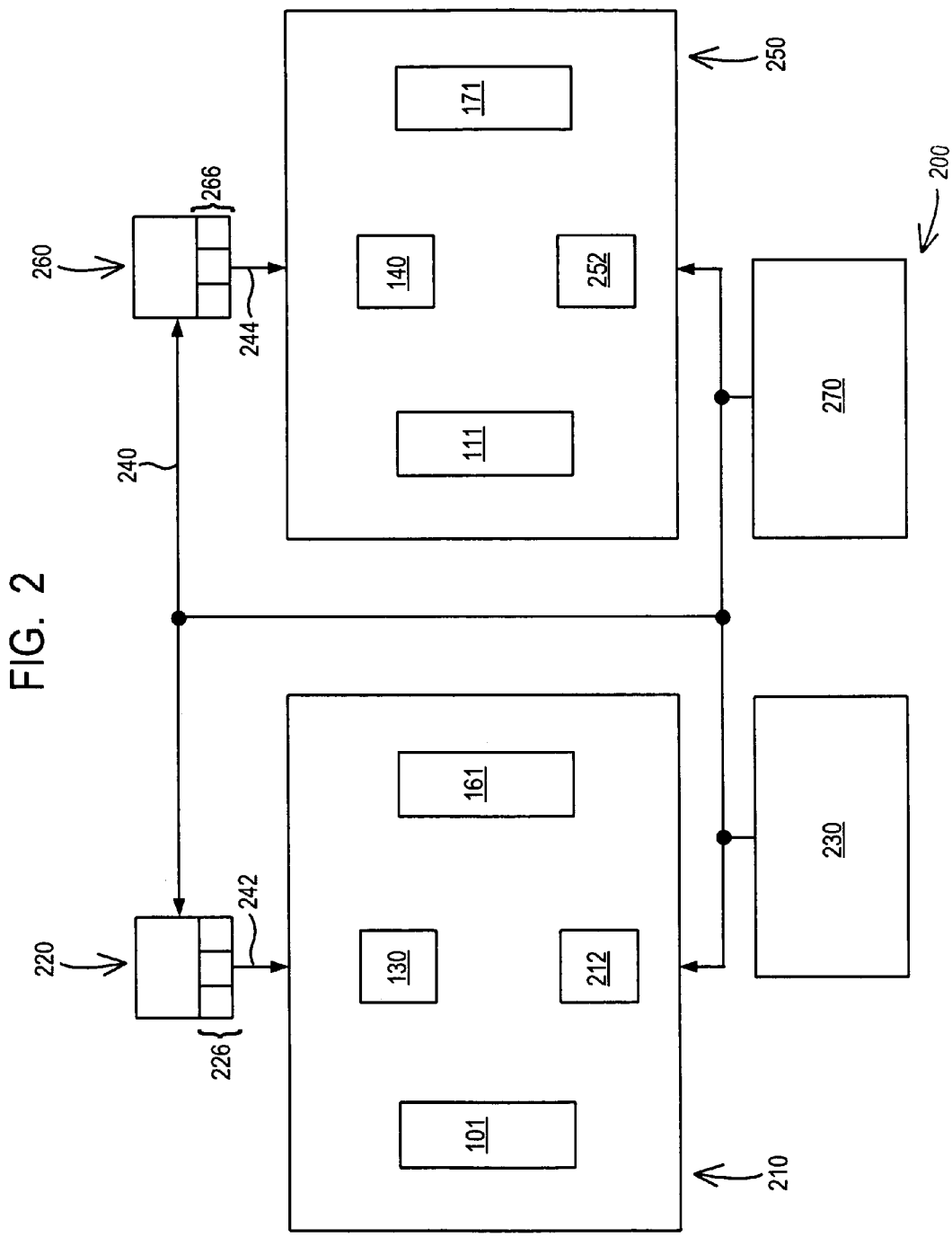
FIG. 2 is a block diagram showing a power system which comprises a power bus interconnecting two controllers, two power supplies, and two battery-backup assemblies.

In the illustrated embodiment of FIG. 2, power bus 240 provides power to controller 210, BBU 220, controller 250, and BBU 260. Controller 210 is interconnected to BBU 220 by power bus 242. Controller 250 is interconnected to BBU 260 by power bus 244.

BBU 220 comprises one or more rechargeable batteries 226. In the event power bus 240 fails to provide sufficient power to controller 220, the one or more rechargeable batteries 226 provide power to controller 220. As those skilled in the art will appreciate, BBU 220 draws power from power bus 240 to maintain a nominal voltage in the one or more rechargeable batteries 226.

BBU 260 comprises one or more rechargeable batteries 266. In the event power bus 240 fails to provide sufficient power to controller 250, the one or more rechargeable batteries 266 provide power to controller 250. As those skilled in the art will appreciate, BBU 260 draws power from power bus 240 to maintain a nominal voltage in the one or more rechargeable batteries 266.

Figure 3A:
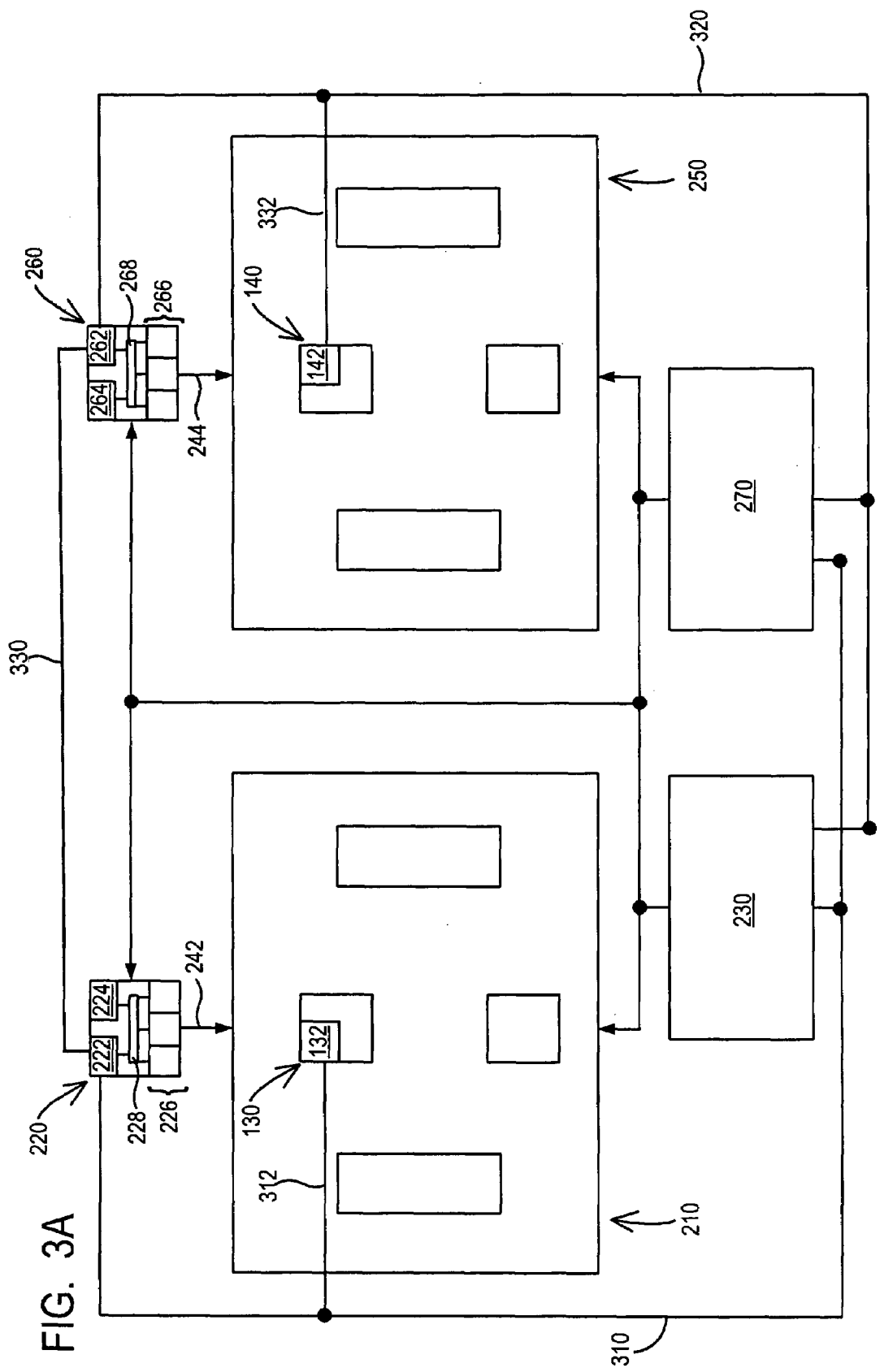
FIG. 3A is a block diagram showing certain communication links disposed in the power system of FIG. 2.

Referring now to FIG. 3A, BBU 220 further comprises processor 222 and microcode 224. Communication link 330 interconnects BBU 220 and BBU 260. In certain embodiments, communication link 330 interconnects processor 222 and processor 262.

Communication link 310 interconnects BBU 220, power supply 230, and power supply 270. Communication links 310 and 312 interconnect control portion 130, which comprises processor 132, with BBU 220, power supply 230, and power supply 270. In certain embodiments, communication links 310 and 312 interconnect, inter alia, processor 132 and processor 222.

BBU 260 further comprises processor 262 and microcode 264. Communication link 320 interconnects BBU 260, power supply 230, and power supply 270. Communication links 320 and 332 interconnect control portion 140, which comprises processor 142, with BBU 260, power supply 230, and power supply 270. In certain embodiments, communication links 320 and 332 interconnect, inter alia, processor 142 and processor 262.

Figure 3B:
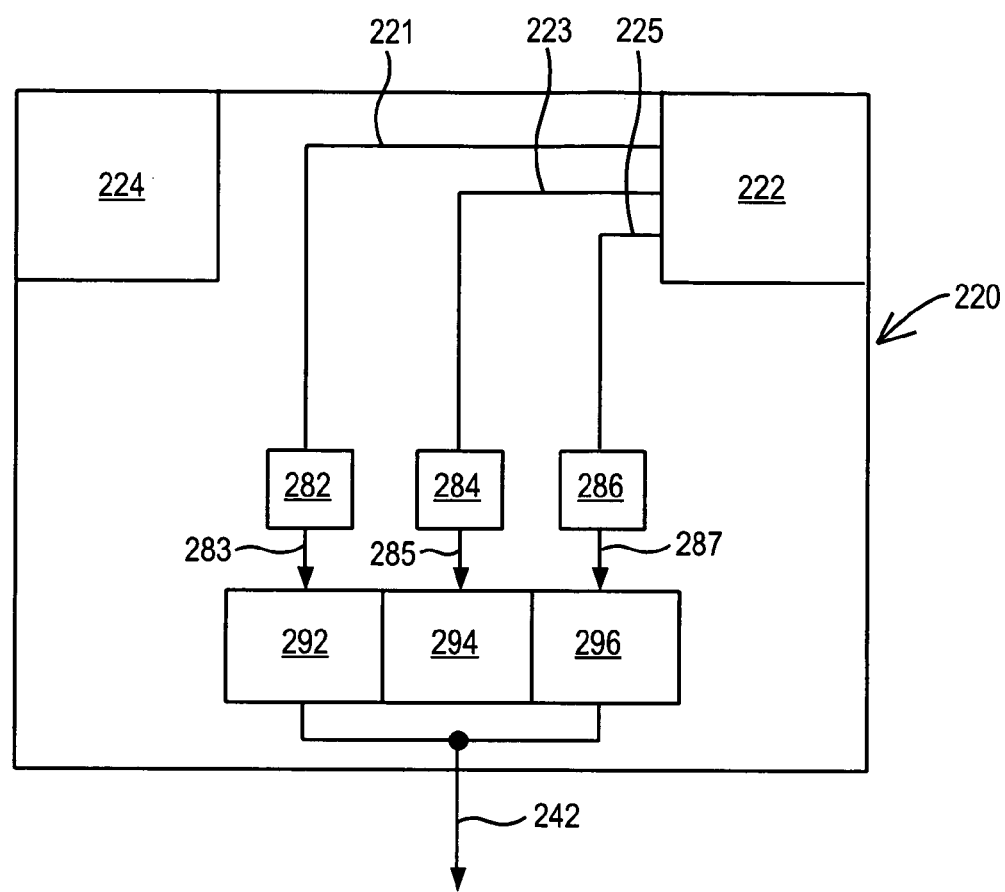
FIG. 3B is a block diagram showing Applicants' Battery Back Up assembly.

Referring now to FIG. 3B, in certain embodiments, each of Applicants' BBUs comprise three battery charging elements, such as battery charging elements 282, 284, and 286, wherein each of those battery charging elements are interconnected with the processor, such as processor 222, disposed in the BBU, and wherein each of those battery charging elements are interconnected with, and provide power to, a rechargeable battery disposed in that BBU.

Referring now to FIGS. 2 and 3A, power supplies 230 and 270 provide power to power bus 240. In certain embodiments, power supply 230 is sized to support a first maximum system load generated by controller 210, controller 250, BBU 220, and BBU 260. In certain embodiments, power supply 270 is sized to support the first maximum system load generated by controller 210, controller 250, BBU 220, and BBU 260. For example, if controllers 210 and 250 each have a 100 watt load, and if BBU 220 and BBU 260 each have a 50 watt load, then the maximum system load is 300 watts. In certain embodiments, both power supply 230 and power supply 270 are designed to support the first maximum system load of 300 watts.

As those skilled in the art will appreciate, power supply 230 in combination with power supply 270 comprises an N+1 redundant power system. Even if controllers 210 and 250 are simultaneously drawing their loads, and even if BBUs 220 and 260 are also simultaneously drawing their loads, a complete failure of either power supply 230 or power supply 270 will not render either controller 210 or controller 250 inoperable.

Applicants' invention includes a method to provide power to controller 210, and controller 250, and BBU 220, and BBU 260, wherein in certain embodiments both BBUs do not draw their loads at the same time from power bus 240. For example, if controllers 210 and 250 each have a 100 watt load, and if BBU 220 and BBU 260 each have a 50 watt load, but only one BBU consumes power at any given time, then a second maximum system load is 250 watts.

In certain embodiments, both power supply 230 and power supply 270 are designed to support the second maximum system load of 250 watts. As those skilled in the art will appreciate, reducing the output power requirements for the two power supplies from 300 watts to 250 watts reduces the cost of the system shown in FIG. 2. Alternatively, in certain embodiments, both power supply 230 and power supply 270 are designed to support the first maximum system load of 300 watts even though the system will only generate the second maximum system load of 250 watts. As those skilled in the art will further appreciate, using an (N+1) redundant power system wherein each power supply comprises about a 20 percent over-rating will increase the mean time between failure ("MTBF") for each of those power supplies. Such an enhanced MTBF results in providing a more robust and reliable information storage and retrieval system, such as system 100.

Figure 4:
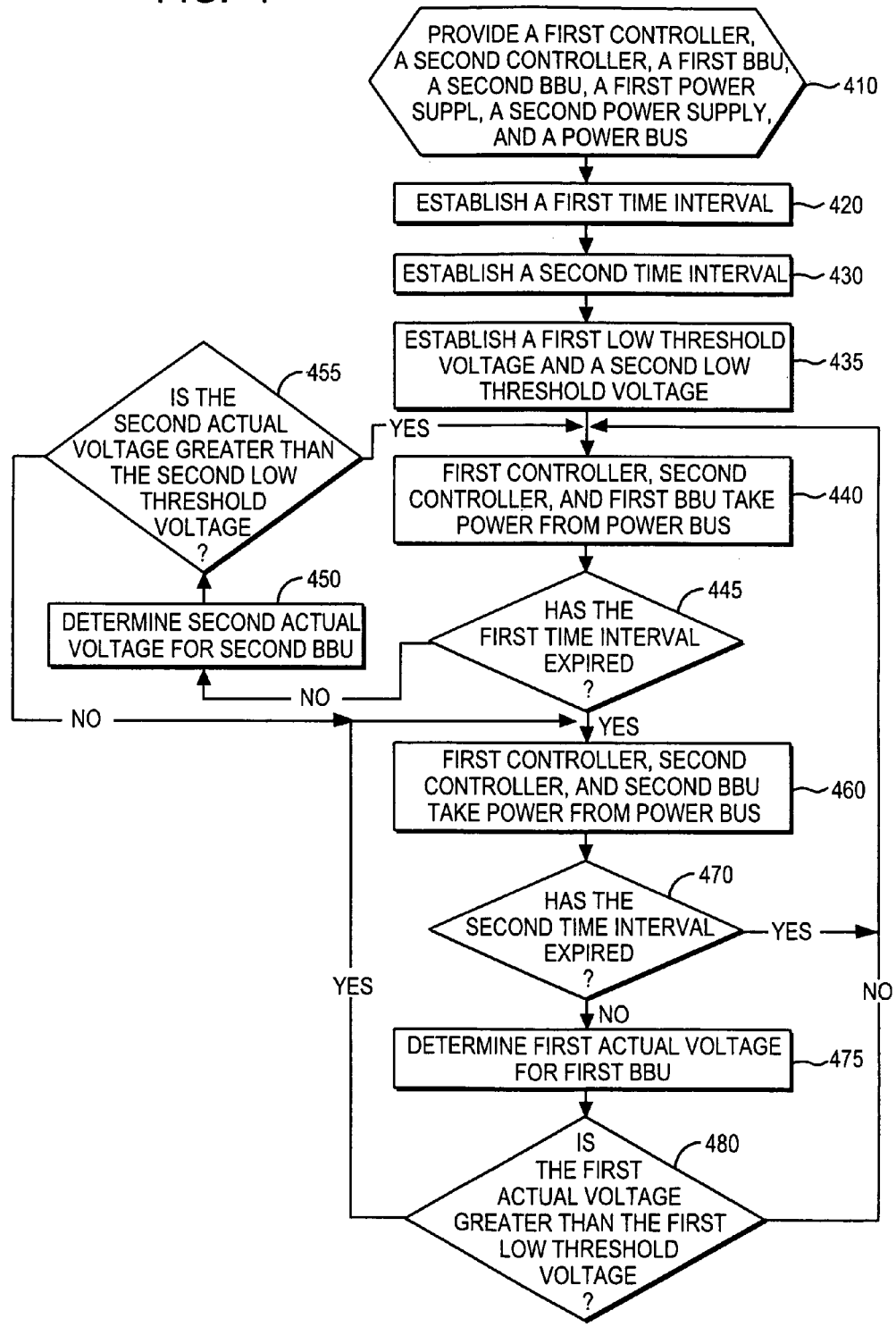
FIG. 4 is a flow chart summarizing the steps of one embodiment of Applicants' method.

Referring now to FIG. 4, in step 410 Applicants' method provides a first controller, such as controller 210, a second controller, such as controller 250, a first BBU interconnected with the first controller, such as BBU 220, a second BBU interconnected with the second controller, such as BBU 260, a first power supply interconnected with the first controller, the second controller, the first BBU, and the second BBU, such as power supply 230, and a second power supply interconnected with the first controller, the second controller, the first BBU, and the second BBU, such as power supply 270.

In step 420, Applicants' method sets a first time interval, wherein Applicants' method may charge the one or more batteries, such as batteries 226, disposed in the first BBU during that first time interval. In certain embodiments, the first time interval is determined by the manufacturer of the information storage and retrieval system, such as system 100, comprising the components of step 410. In certain embodiments, the first time interval of step 420 is determined by the owner and/or operator of the information storage and retrieval system, such as system 100, comprising the components of step 410.

In certain embodiments, the first time interval is set in firmware and/or microcode disposed in the information storage and retrieval system comprising the components of step 410. In certain embodiments, the first time interval of step 420 is set in firmware and/or microcode disposed in the controller, such as controller 210, interconnected with the first BBU. In certain embodiments, the first time interval is set in firmware and/or microcode disposed in the first BBU.

In step 430, Applicants' method sets a second time interval, wherein Applicants' method may charge the one or more batteries, such as batteries 266, disposed in the second BBU during that second time interval. In certain embodiments, the second time interval is determined by the manufacturer of the information storage and retrieval system, such as system 100, comprising the components of step 410. In certain embodiments, the second time interval of step 430 is determined by the owner and/or operator of the information storage and retrieval system, such as system 100, comprising the components of step 410.

In certain embodiments, the second time interval is set in firmware and/or microcode disposed in the information storage and retrieval system comprising the components of step 410. In certain embodiments, the second time interval of step 430 is set in firmware and/or microcode disposed in the controller, such as controller 210, interconnected with the second BBU. In certain embodiments, the second time interval is set in firmware and/or microcode disposed in the second BBU.

In step 435, Applicants' method establishes a first low threshold voltage and a second low threshold voltage. In certain embodiments, the first low threshold voltage, and the second low threshold voltage, of step 435 are set in firmware and/or microcode disposed in a first controller, such as controller 210. In certain embodiments, the first low threshold voltage, and the second low threshold voltage, of step 435 are set in firmware and/or microcode disposed in a second controller, such as controller 250. In certain embodiments, the first low threshold voltage, and the second low threshold voltage, of step 435 are set in firmware and/or microcode disposed in the first BBU. In certain embodiments, the first low threshold voltage, and the second low threshold voltage, of step 435 are set in firmware and/or microcode disposed in the second BBU.

The first low threshold voltage comprises a voltage at which the batteries disposed in the first BBU are essentially discharged. The second low threshold voltage comprises a voltage at which the batteries disposed in the second BBU are essentially discharged.

In step 440, the first controller, the second controller, and the first BBU, such as BBU 220, draw charging power from the power bus. In certain embodiments, step 440 includes processor 262 controlling battery charging element 268 disposed in BBU 260, such that battery charging element 268 does not charge rechargeable batteries 266 during the first time interval as established in step 420.

In step 445, Applicants' method determines if the first time interval has expired. In certain embodiments, step 445 is performed by a processor disposed in the first BBU. In certain embodiments, step 445 is performed by a processor disposed in the second BBU.

If Applicants' method determines in step 445 that the first time interval has expired, then the method transitions from step 445 to step 460. Alternatively, if Applicants' method determines in step 445 that the first time interval has not expired, then the method transitions from step 445 to step 450 wherein the method determines a second actual voltage for the batteries disposed in the second BBU. In certain embodiments, step 450 is performed by a processor disposed in the first BBU. In certain embodiments, step 450 is performed by a processor disposed in the second BBU.

Applicants' method transitions from step 450 to step 455 wherein the method determines if the second actual voltage of step 450 is greater than the second low threshold voltage of step 435. In certain embodiments, step 455 is performed by a processor disposed in the first BBU. In certain embodiments, step 455 is performed by a processor disposed in the second BBU.

If Applicants' method determines in step 455 that the second actual voltage of step 450 is greater than the second low threshold voltage of step 435, then the method transitions from step 455 to step 440 and continues as described herein. Alternatively, if Applicants' method determines in step 455 that the second actual voltage of step 450 is not greater than the second low threshold voltage of step 435, then the method transitions from step 455 to step 460 wherein the first controller, the second controller, and the second BBU, such as BBU 260, draw charging power from the power bus. In certain embodiments, step 460 includes control of battery charging element 228 disposed in BBU 220, such that battery charging element 228 does not charge rechargeable batteries 226 during the second time interval of step 430.

In step 470, Applicants' method determines if the second time interval has expired. In certain embodiments, step 470 is performed by a processor disposed in the first BBU. In certain embodiments, step 470 is performed by a processor disposed in the second BBU.

If Applicants' method determines in step 470 that the second time interval has expired, then the method transitions from step 470 to step 440 and continues as described herein. If Applicants' method determines in step 470 that the second time interval has not expired, then the method transitions from step 470 to step 475 wherein the method determines a first actual voltage for the batteries disposed in the first BBU. In certain embodiments, step 475 is performed by a processor disposed in the first BBU. In certain embodiments, step 475 is performed by a processor disposed in the second BBU.

Applicants' method transitions from step 475 to step 480 wherein the method determines if the first actual voltage of step 475 is greater than the first low threshold voltage of step 435. In certain embodiments, step 480 is performed by a processor disposed in the first BBU. In certain embodiments, step 480 is performed by a processor disposed in the second BBU.

If Applicants' method determines in step 480 that the first actual voltage of step 475 is greater than the first low threshold voltage of step 435, then the method transitions from step 480 to step 460 and continues as described herein. Alternatively, if Applicants' method determines in step 480 that the first actual voltage of step 475 is not greater than the first low threshold voltage of step 435, then the method transitions from step 480 to step 440 and continues as described herein.

Referring now to FIG. 5A, in step 510 Applicants' method provides a first controller, such as controller 210, a second controller, such as controller 250, a first BBU interconnected with the first controller, such as BBU 220, a second BBU interconnected with the second controller, such as BBU 260, a first power supply interconnected with the first controller, the second controller, the first BBU, and the second BBU, such as power supply 230, and a second power supply interconnected with the first controller, the second controller, the first BBU, and the second BBU, such as power supply 270.

In step 520, Applicants' method sets a first nominal voltage, and a first low threshold voltage for the one or more batteries, such as batteries 226, disposed in the first BBU. In certain embodiments, the first nominal voltage, and/or the first low threshold voltage, is determined by the manufacturer of the information storage and retrieval system, such as system 100, comprising the components of step 510. In certain embodiments, the first nominal voltage, and/or the first low threshold voltage, of step 520 is determined by the owner and/or operator of the information storage and retrieval system, such as system 100, comprising the components of step 510.

In certain embodiments, the first nominal voltage, and/or the first low threshold voltage, is set in firmware and/or microcode disposed in the information storage and retrieval system comprising the components of step 510. In certain embodiments, the first nominal voltage, and/or the first low threshold voltage, of step 520 is set in firmware and/or microcode disposed in the controller, such as controller 210, interconnected with the first BBU. In certain embodiments, the first nominal voltage, and/or the first low threshold voltage, is set in firmware and/or microcode disposed in the first BBU.

In step 530, Applicants' method sets a second nominal voltage, and a second low threshold voltage, for the one or more batteries, such as batteries 266, disposed in the second BBU. In certain embodiments, the second nominal voltage, and a second low threshold voltage, is determined by the manufacturer of the information storage and retrieval system, such as system 100, comprising the components of step 510. In certain embodiments, the second nominal voltage, and a second low threshold voltage, of step 530 is determined by the owner and/or operator of the information storage and retrieval system, such as system 100, comprising the components of step 510.

In step 540, the first controller, the second controller, and the first BBU, such as BBU 220, draw power from the power bus. In certain embodiments, step 540 includes control of the battery charging element 268 of BBU 260, such that battery charging element 268 does not charge rechargeable batteries 266.

In step 550, Applicants' method determines a first actual voltage for the one or more batteries, such as batteries 226, disposed in the first BBU, and a second actual voltage for the one or more batteries, such as batteries 268, disposed in the second BBU. In certain embodiments, step 550 is performed by a processor disposed in the first BBU. In certain embodiments, step 550 is performed by a processor disposed in the second BBU. In certain embodiments, step 550 is performed by a processor disposed in the first controller. In certain embodiments, step 550 is performed by a processor disposed in the second controller.

In step 560, Applicants' method determines if the first actual voltage is greater than or equal to the first nominal voltage. In certain embodiments, step 560 is performed by a processor disposed in the first BBU. In certain embodiments, step 560 is performed by a processor disposed in the second BBU. In certain embodiments, step 560 is performed by a processor disposed in the first controller. In certain embodiments, step 560 is performed by a processor disposed in the second controller.

Figure 5B:
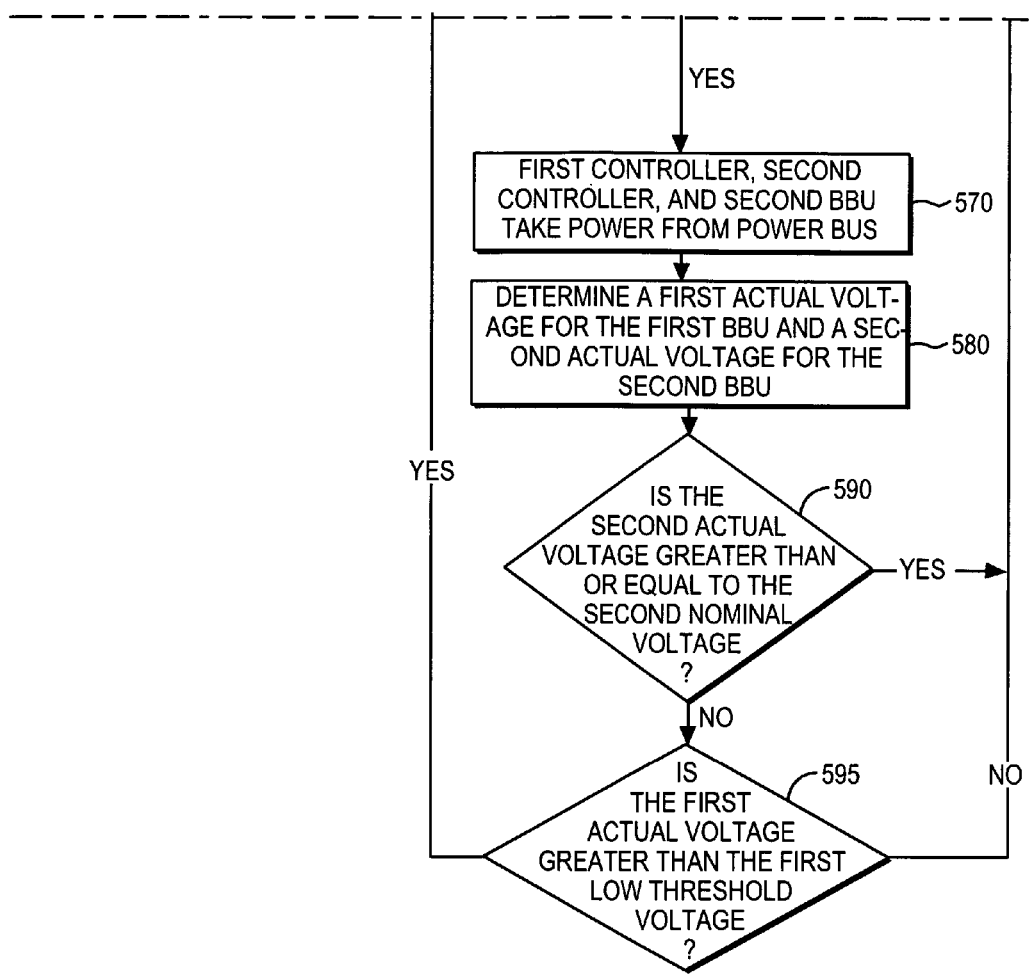
FIG. 5B is a flow chart summarizing additional steps of a second embodiment of Applicants' method.

If Applicants' method determines in step 560 that the first actual voltage is greater than or equal to the first nominal voltage, then the method transitions from step 560 to step 570 (FIG. 5B). Alternatively, if Applicants' method determines in step 560 that the first actual voltage is not greater than or equal to the first nominal voltage, then the method transitions from step 560 to step 565 wherein the method determines if the second actual voltage is greater than the second low threshold voltage. In certain embodiments, step 565 is performed by a processor disposed in the first BBU. In certain embodiments, step 565 is performed by a processor disposed in the second BBU. In certain embodiments, step 565 is performed by a processor disposed in the first controller. In certain embodiments, step 565 is performed by a processor disposed in the second controller.

If Applicants' method determines in step 565 that the second actual voltage is greater than the second low threshold voltage, then the method transitions from step 565 to step 540 and continues as described herein. Alternatively, if Applicants' method determines in step 565 that the second actual voltage is not greater than the second low threshold voltage, then the method transitions from step 565 to step 570 wherein the first controller, the second controller, and the second BBU, such as BBU 260, draw power from the power bus. In certain embodiments, the step 570 includes control of the battery charging element 228 disposed in BBU 220, such that battery charging element 228 does not charge rechargeable batteries 226.

Referring now to FIG. 5B, in step 580 Applicants' method determines a first actual voltage for the one or more batteries, such as batteries 226, disposed in the first BBU, and a second actual voltage for the one or more batteries, such as batteries 266, disposed in the second BBU. In certain embodiments, step 580 is performed by a processor disposed in the first BBU. In certain embodiments, step 580 is performed by a processor disposed in the second BBU. In certain embodiments, step 580 is performed by a processor disposed in the first controller. In certain embodiments, step 580 is performed by a processor disposed in the second controller.

Applicants' method transitions from step 580 to step 590 wherein the method determines if the second actual voltage is greater than or equal to the second nominal voltage. In certain embodiments, step 590 is performed by a processor disposed in the first BBU. In certain embodiments, step 590 is performed by a processor disposed in the second BBU. In certain embodiments, step 590 is performed by a processor disposed in the first controller. In certain embodiments, step 590 is performed by a processor disposed in the second controller.

If Applicants' method determines in step 590 that the second actual voltage is greater than or equal to the second nominal voltage, then the method transitions from step 590 to step 540 and continues as described herein. If Applicants' method determines in step 590 that the second actual voltage is not greater than or equal to the second nominal voltage, then the method transitions from step 590 to step 595 wherein the method determines if the first actual voltage of step 580 is greater than the first low threshold voltage of step 520. In certain embodiments, step 595 is performed by a processor disposed in the first BBU. In certain embodiments, step 595 is performed by a processor disposed in the second BBU. In certain embodiments, step 595 is performed by a processor disposed in the first controller. In certain embodiments, step 595 is performed by a processor disposed in the second controller.

If Applicants' method determines in step 595 that the first actual voltage of step 580 is greater than the first low threshold voltage of step 520, then the method transitions from step 595 to step 570 and continues as described herein. Alternatively, if Applicants' method determines in step 595 that the first actual voltage of step 580 is not greater than the first low threshold voltage of step 520, then the method transitions from step 595 to step 540 and continues as described herein.

In certain embodiments of Applicants' invention, each BBU, such as BBUs 220 and 260, are capable of determining that a power supply, such as power supply 230 or power supply 270, is inoperable. By "inoperable," Applicants mean that the power supply is not capable of supplying its designed load.

In the event a BBU determines that both power supplies are operable, i.e. capable of providing the maximum system load, then that BBU when receiving power from power bus 240 charges the one or more batteries disposed therein at a first charge rate. In the event a BBU determines that one of the interconnected power supplies is inoperable, then that BBU when receiving power from power bus 240 charges the one or more batteries disposed therein at a second charge rate, wherein the first charge rate is greater than the second charge rate.

In certain embodiments, when using the first charge rate a BBU consumes 50 watts of power, and when using the second charge rate each BBU consumes 10 watts of power. In embodiments wherein both BBUs charge simultaneously using the second charge rate, power system 200 generates a third maximum system load of 220 watts. In embodiments wherein the BBUs charge sequentially using the second charge rate, power system 200 (FIG. 2) generates a fourth maximum system load of 210 watts.

In certain embodiments, both power supply 230 and power supply 270 are designed to supply the third maximum system load of 220 watts. As those skilled in the art will appreciate, reducing the output power requirements for the two power supplies from 300 watts to 220 watts reduces the cost of the system shown in FIG. 2. In certain embodiments, both power supply 230 and power supply 270 are designed to supply the fourth maximum system load of 210 watts. As those skilled in the art will appreciate, reducing the output power requirements for the two power supplies from 300 watts to 210 watts reduces the cost of the system shown in FIG. 2.

Alternatively, in certain embodiments, both power supply 230 and power supply 270 are designed to supply the first maximum system load of 300 watts even though the system will only generate the third maximum system load of 220 watts. As those skilled in the art will further appreciate, using an (N+1) redundant power system wherein each power supply comprises about a 36 percent over-rating will increase the mean time between failure ("MTBF") for each of those power supplies. Such an enhanced MTBF results in providing a more robust and reliable information storage and retrieval system, such as system 100.

Alternatively, in certain embodiments, both power supply 230 and power supply 270 are designed to supply the first maximum system load of 300 watts even though the system will only generate the fourth maximum system load of 210 watts. As those skilled in the art will further appreciate, using an (N+1) redundant power system wherein each power supply comprises about a 43 percent over-rating will increase the mean time between failure ("MTBF") for each of those power supplies. Such an enhanced MTBF results in providing a more robust and reliable information storage and retrieval system, such as system 100.

Referring now to FIG. 6A, in step 605 Applicants' method provides a first controller, such as controller 210, a second controller, such as controller 250, a first BBU interconnected with the first controller, such as BBU 220, a second BBU interconnected with the second controller, such as BBU 260, a first power supply interconnected with the first controller, the second controller, the first BBU, and the second BBU, such as power supply 230, and a second power supply interconnected with the first controller, the second controller, the first BBU, and the second BBU, such as power supply 270.

In step 610, Applicants' method sets a first nominal voltage for the one or more batteries, such as batteries 226, disposed in the first BBU. In certain embodiments, the first nominal voltage is determined by the manufacturer of the information storage and retrieval system, such as system 100, comprising the components of step 605. In certain embodiments, the first nominal voltage of step 610 is determined by the owner and/or operator of the information storage and retrieval system, such as system 100, comprising the components of step 605.

In certain embodiments, the first nominal voltage is set in firmware and/or microcode disposed in the information storage and retrieval system comprising the components of step 605. In certain embodiments, the first nominal voltage of step 610 is set in firmware and/or microcode disposed in the controller, such as controller 210, interconnected with the first BBU. In certain embodiments, the first nominal voltage is set in firmware and/or microcode disposed in the first BBU.

In step 615, Applicants' method sets a second nominal voltage for the one or more batteries, such as batteries 266, disposed in the second BBU. In certain embodiments, the second nominal voltage is determined by the manufacturer of the information storage and retrieval system, such as system 100, comprising the components of step 605. In certain embodiments, the second nominal voltage of step 615 is determined by the owner and/or operator of the information storage and retrieval system, such as system 100, comprising the components of step 605.

In certain embodiments, the second nominal voltage is set in firmware and/or microcode disposed in the information storage and retrieval system comprising the components of step 605. In certain embodiments, the second nominal voltage of step 615 is set in firmware and/or microcode disposed in the controller, such as controller 210, interconnected with the first BBU. In certain embodiments, the second nominal voltage is set in firmware and/or microcode disposed in the first BBU.

In step 620, Applicants' method sets a first charge rate for the one or more batteries, such as batteries 226, disposed in the first BBU. In certain embodiments, the first charge rate is determined by the manufacturer of the information storage and retrieval system, such as system 100, comprising the components of step 605. In certain embodiments, the first charge rate of step 620 is determined by the owner and/or operator of the information storage and retrieval system, such as system 100, comprising the components of step 605.

In certain embodiments, the first charge rate is set in firmware and/or microcode disposed in the information storage and retrieval system comprising the components of step 605. In certain embodiments, the first charge rate of step 620 is set in firmware and/or microcode disposed in the controller, such as controller 210, interconnected with the first BBU. In certain embodiments, the first charge rate is set in firmware and/or microcode disposed in the first BBU.

In step 625, Applicants' method sets a second charge rate for the one or more batteries, such as batteries 266, disposed in the second BBU. In certain embodiments, the second charge rate is determined by the manufacturer of the information storage and retrieval system, such as system 100, comprising the components of step 605. In certain embodiments, the second charge rate of step 625 is determined by the owner and/or operator of the information storage and retrieval system, such as system 100, comprising the components of step 605.

In certain embodiments, the second charge rate is set in firmware and/or microcode disposed in the information storage and retrieval system comprising the components of step 605. In certain embodiments, the second charge rate of step 625 is set in firmware and/or microcode disposed in the controller, such as controller 250, interconnected with the second BBU. In certain embodiments, the second charge rate is set in firmware and/or microcode disposed in the second BBU.

Figure 6B:
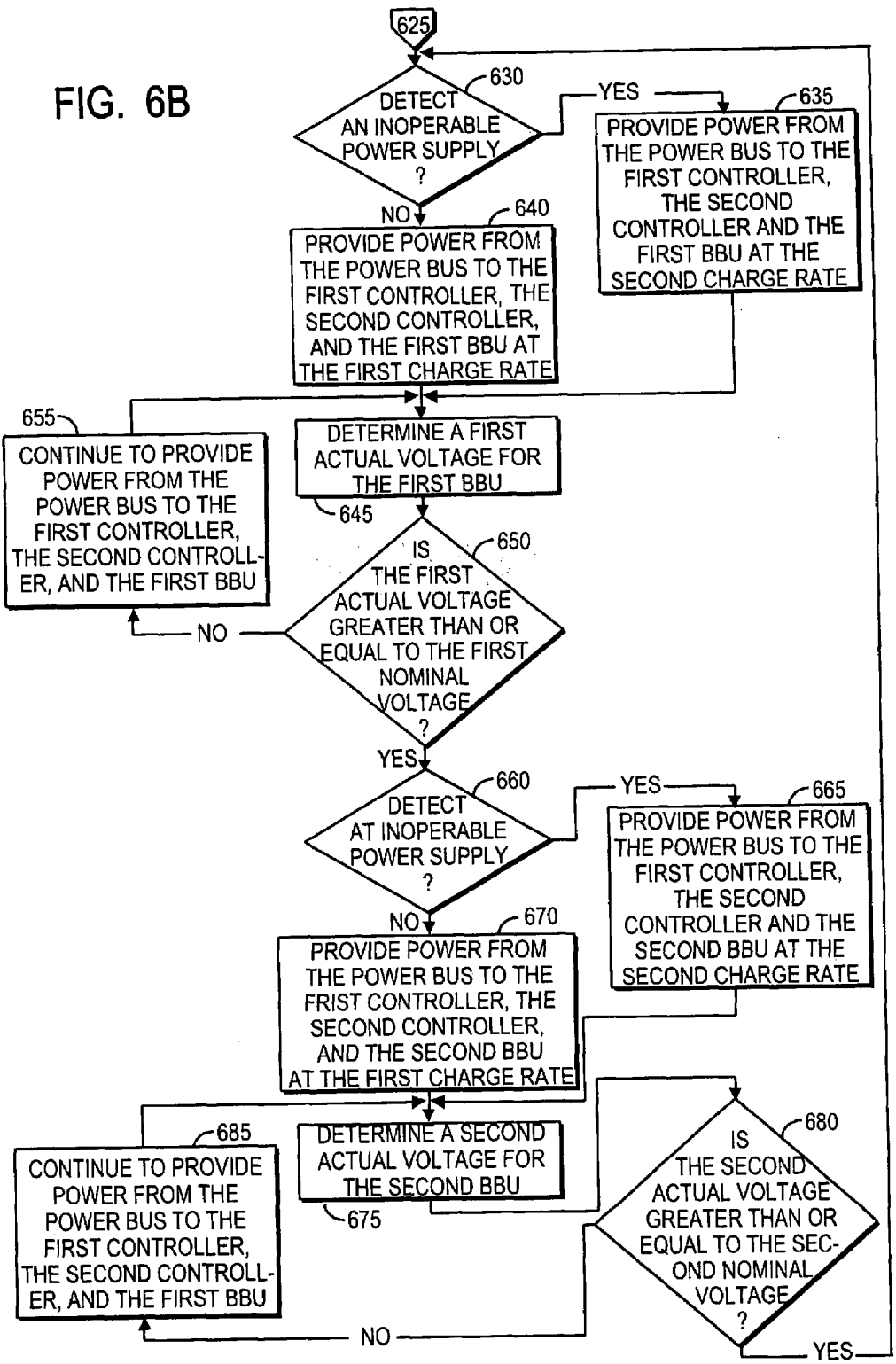
FIG. 6B is a flow chart summarizing additional steps of the third embodiment of Applicants' method.

Referring now to FIG. 6B, Applicants' method transitions from step 625 to step 630 wherein the method determines if an inoperable power supply is detected. In certain embodiments, step 630 is performed by the first BBU. In certain embodiments, step 630 is performed by the second BBU. In certain embodiments, step 630 is performed by the first controller. In certain embodiments, step 630 is performed by the second controller.

If Applicants' method detects in step 630 an inoperable power supply, then the method transitions from step 630 to step 635 wherein the first controller, the second controller, and the first BBU, such as BBU 220, draw power from the power bus, and wherein the first BBU draws power at the second charge rate. In certain embodiments, step 630 includes disconnecting the second BBU, such as BBU 260, from the power bus, such as power bus 240, and setting software and/or firmware and/or hardware in the first BBU to consume power at the second charge rate. In certain embodiments, a processor disposed in the second BBU, such as processor 262 (FIG. 2), disconnects the second BBU from the power bus. In certain embodiments, a processor disposed in the first BBU, such as processor 222 (FIG. 3A) sets software and/or firmware and/or hardware in the first BBU to consume power at the second charge rate. In other embodiments, the step 630 includes control of the battery charging element of the second BBU, such as BBU 260 such that it does not charge its rechargeable batteries 266 until it is determined that the rechargeable batteries 226 of BBU 220 have achieved the first nominal voltage level of step 610.

If Applicants' method determines in step 630 that an inoperable power supply is not detected, then the method transitions from step 630 to step 640 wherein the method provides power from the power bus, such as power bus 240 (FIG. 2), to the first controller, the second controller, and the first BBU, such as BBU 220, wherein the first BBU consumes power at the first charge rate. In certain embodiments, step 640 includes disconnecting the second BBU, such as BBU 260, from the power bus, such as power bus 240, and setting software and/or firmware and/or hardware in the first BBU to consume power at the first charge rate. In certain embodiments, a processor disposed in the second BBU, such as processor 262, disconnects the second BBU from the power bus. In certain embodiments, a processor disposed in the first BBU sets software and/or firmware and/or hardware in the first BBU to consume power at the first charge rate. In other embodiments, the step 640 includes control of the battery charging element of the second BBU, such as BBU 260 such that it does not charge its rechargeable batteries 266 until it is determined that the rechargeable batteries 226 of BBU 220 have achieved the first nominal voltage level of step 610.

Applicants' method transitions from step 640 to step 645 wherein the method determines a first actual voltage for the one or more batteries, such as batteries 226, disposed in the first BBU. In certain embodiments, step 645 is performed by a processor disposed in the first BBU. In certain embodiments, step 645 is performed by a processor disposed in the second BBU. In certain embodiments, step 645 is performed by a processor disposed in the first controller. In certain embodiments, step 645 is performed by a processor disposed in the second controller.

Applicants' method transitions from step 645 to 650 wherein the method determines if the first actual voltage is greater than or equal to the first nominal voltage. In certain embodiments, step 650 is performed by a processor disposed in the first BBU. In certain embodiments, step 650 is performed by a processor disposed in the second BBU. In certain embodiments, step 650 is performed by a processor disposed in the first controller. In certain embodiments, step 650 is performed by a processor disposed in the second controller.

If Applicants' method determines in step 650 that the first actual voltage is not greater than or equal to the first nominal voltage, then the method transitions from step 650 to step 655 wherein Applicants' method continues supplying power to the first controller, the second controller, and the first BBU, at either the first charge rate or second charge rate as determined in steps 640 and 635, respectively. Applicants' method transitions from step 655 to step 645 and continues as described herein.

Alternatively, if Applicants' method determines in step 650 that the first actual voltage is greater than or equal to the first nominal voltage, then the method transitions from step 650 to step 660 wherein the method determines if an inoperable power supply is detected. In certain embodiments, step 660 is performed by the first BBU. In certain embodiments, step 660 is performed by the second BBU. In certain embodiments, step 660 is performed by the first controller. In certain embodiments, step 660 is performed by the second controller.

If Applicants' method detects in step 660 an inoperable power supply, then the method transitions from step 660 to step 665 wherein the method provides power from the power bus, such as power bus 240 (FIG. 2), to the first controller, the second controller, and the second BBU, such as BBU 260, wherein the second BBU consumes power at the second charge rate. In certain embodiments, step 665 includes disconnecting the first BBU, such as BBU 220, from the power bus, such as power bus 240, and setting software and/or firmware and/or hardware in the second BBU to consume power at the second charge rate. In certain embodiments, a processor disposed in the first BBU, such as processor 222, disconnects the first BBU from the power bus. In certain embodiments, a processor disposed in the second BBU, such as processor 262, sets software and/or firmware and/or hardware in the second BBU to consume power at the second charge rate. In other embodiments, the step 660 includes control of the battery charging element of the first BBU, such as BBU 220 such that it does not charge its rechargeable batteries 226 until it is determined that the rechargeable batteries 266 of BBU 260 have achieved the first nominal voltage level of step 615.

If Applicants' method determines in step 660 that an inoperable power supply is not detected, then the method transitions from step 660 to step 670 wherein the method provides power from the power bus, such as power bus 240 (FIG. 2), to the first controller, the second controller, and the second BBU, such as BBU 260, wherein the second BBU consumes power at the first charge rate. In certain embodiments, step 670 includes disconnecting the first BBU, such as BBU 220, from the power bus, such as power bus 240, and setting software and/or firmware and/or hardware in the second BBU to consume power at the first charge rate. In certain embodiments, a processor disposed in the first BBU, such as processor 222, disconnects the first BBU from the power bus. In certain embodiments, a processor disposed in the second BBU, such as processor 262, sets software and/or firmware and/or hardware in the second BBU to consume power at the first charge rate. In other embodiments, the step 660 includes control of the battery charging element of the first BBU, such as BBU 220 such that it does not charge its rechargeable batteries 226 until it is determined that the rechargeable batteries 266 of BBU 260 have achieved the first nominal voltage level of step 610.

Applicants' method transitions from step 670 to step 675 wherein the method determines a second actual voltage for the one or more batteries, such as batteries 266, disposed in the second BBU. In certain embodiments, step 675 is performed by a processor disposed in the first BBU. In certain embodiments, step 675 is performed by a processor disposed in the second BBU. In certain embodiments, step 675 is performed by a processor disposed in the first controller. In certain embodiments, step 675 is performed by a processor disposed in the second controller.

Applicants' method transitions from step 675 to 680 wherein the method determines if the second actual voltage is greater than or equal to the second nominal voltage. In certain embodiments, step 680 is performed by a processor disposed in the first BBU. In certain embodiments, step 680 is performed by a processor disposed in the second BBU. In certain embodiments, step 680 is performed by a processor disposed in the first controller. In certain embodiments, step 680 is performed by a processor disposed in the second controller.

If Applicants' method determines in step 680 that the second actual voltage is not greater than or equal to the second nominal voltage, then the method transitions from step 680 to step 685 wherein Applicants' method continues supplying power to the second BBU, at either the first charge rate or second charge rate as determined in steps 670 and 665, respectively. Applicants' method transitions from step 685 to step 675 and continues as described herein. Alternatively, if Applicants' method determines in step 680 that the second actual voltage is greater than or equal to the second nominal voltage, then the method transitions from step 680 to step 630 and continues as described herein.

The embodiments of Applicants' method recited in FIG. 4, and/or FIG. 5A, and/or FIG. 5B, and/or FIG. 6A, and/or FIG. 6B, may be implemented separately. Moreover, in certain embodiments, individual steps recited in FIG. 4, and/or FIG. 5A, and/or FIG. 5B, and/or FIG. 6A, and/or FIG. 6B, may be combined, eliminated, or reordered.

In certain embodiments, Applicants' invention includes instructions residing in the memory, such as memory 133 (FIG. 1) and/or memory 143 (FIG. 1), of a control portion, such as control portion 130 (FIGS. 1, 2, 3) and/or 140 (FIGS. 1, 2, 3), of a controller, such as controller 210 (FIGS. 2, 3) and/or controller 250 (FIGS. 2, 3), where those instructions are executed by a processor, such as processor 132 (FIGS. 1, 3), and/or processor 142 (FIGS. 1, 3) to perform steps 440, 450, 460, and 470, recited in FIG. 4, and/or steps 540, 550, 560, 570, 580, and/or 590, recited in FIG. 5A and FIG. 5B, and/or steps 610, 615, 620, and/or 625, wherein the processor/controller retrieves a predetermined first nominal voltage, a predetermined second nominal voltage, a predetermined first charge rate, and a predetermined second charge rate, respectively, and/or steps 630, 635, 640, 645, 650, 655, 660, 665, 670, 675, 680, and/or 685, recited in FIG. 6B.

In other embodiments, Applicants' invention includes instructions residing in any other computer program product, where those instructions are executed by a computer external to, or internal to, system 100, to perform steps 440, 450, 460, and 470, recited in FIG. 4, and/or steps 540, 550, 560, 570, 580, and/or 590, recited in FIG. 5A and FIG. 5B, and/or steps 610, 615, 620, and/or 625, wherein the computer retrieves a predetermined first nominal voltage, a predetermined second nominal voltage, a predetermined first charge rate, and a predetermined second charge rate, respectively, and/or steps 630, 635, 640, 645, 650, 655, 660, 665, 670, 675, 680, and/or 685, recited in FIG. 6B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to supply power to one or more battery-backup assemblies disposed in an information storage and retrieval system, comprising the steps of:
   supplying a first controller comprising one or more host adapters, one or more device adapters, a processor, cache, memory, and a Fibre Channel switch, and having a first controller load, and a second controller comprising one or more host adapters, one or more device adapters, a processor, cache, memory, and a Fibre Channel switch, and having a second controller load;
   supplying a first battery-backup assembly having a first BBU load, wherein said first battery-backup assembly is external to and interconnected with said first controller, and a second battery-backup assembly having a second BBU load, wherein said second battery-backup assembly is external to and interconnected with said second controller;
   supplying a power bus interconnected to said first controller, said second controller, said first battery-backup assembly, and said second battery-backup assembly;
   supplying a first power supply interconnected with said power bus;
   supplying a second power supply interconnected with said power bus;
   providing power to said power bus from said first power supply and from said second power supply;
   drawing power from said power bus by said first controller, and said second controller, and said first battery-backup assembly, over a first period of time; and
   drawing power from said power bus power by said first controller, and said second controller, and said second battery-backup assembly, over a second period of time, wherein said first period of time differs from said second period of time.

2. The method of claim 1, wherein:
   said supplying a first power supply further comprises supplying a first power supply capable of supplying a system load comprising the sum of said first controller load, said second controller load, said first BBU load, and said second BBU load;
   said supplying a second power supply further comprises supplying a second power supply capable of supplying a system load comprising the sum of said first controller load, said second controller load, said first BBU load, and said second BBU load.

3. The method of claim 1, wherein:
   said supplying a first power supply further comprises supplying a first power supply capable of providing a second system load comprising the sum of said first controller load, said second controller load, and said first BBU load;
   said supplying a second power supply further comprises supplying a second power supply capable of providing a second system load comprising the sum of said first controller load, said second controller load, and said first BBU load.

4. The method of claim 1, further comprising the steps of:
   providing a first battery-backup assembly comprising first microcode, wherein said first microcode specifies a first time interval;
   providing a second battery-backup assembly comprising second microcode, wherein said second microcode specifies a second time interval;
   wherein said first battery-backup assembly draws power from said power bus during said first time interval; and
   wherein said second battery-backup assembly draws power from said power bus during said second time interval.

5. An article of manufacture comprising:
   a first controller comprising one or more host adapters, one or more device adapters, a processor, cache, memory, and a Fibre Channel switch, and having a first controller load, and a second controller comprising one or more host adapters, one or more device adapters, a processor, cache, memory, and a Fibre Channel switch, and having a second controller load;
   a first battery-backup assembly having a first BBU load, wherein said first battery-backup assembly is external to and interconnected with said first controller, and a second battery-backup assembly having a second BBU load, wherein said second battery-backup assembly is external to and interconnected with said second controller;
   a power bus interconnected to said first controller, said second controller, said first battery-backup assembly, and said second battery-backup assembly;
   a first power supply interconnected with, and providing power to, said power bus;
   a second power supply interconnected with, and providing power to, said power bus; and
   a computer readable medium comprising computer readable program code disposed therein to effect:
   supplying power to said first controller, and to said second controller, and to said first battery-backup assembly, and to said second battery-backup assembly, the computer readable program code comprising a series of computer readable program steps to effect:
   providing power to said first controller and to said second controller and to said first battery-backup assembly over a first period of time; and
   providing power to said first controller and to said second controller and to said second battery-backup assembly over a second period of time, wherein said first period of time interval differs from said second period of time.

6. The article of manufacture of claim 5, wherein said first power supply is capable of supplying a system load comprising the sum of said first controller load, said second controller load, said first BBU load, and said second BBU load; and
   wherein said second power supply is capable of supplying a system load comprising the sum of said first controller load, said second controller load, said first BBU load, and said second BBU load.

7. The article of manufacture of claim 5, wherein said first power supply is capable of supplying a system load comprising the sum of said first controller load, said second controller load, and said first BBU load; and
   wherein said second power supply is capable of supplying a system load comprising the sum of said first controller load, said second controller load, and said first BBU load.

8. The article of manufacture of claim 5, further comprising first microcode specifying a first time interval and second microcode specifying a second tine interval;
   wherein said computer useable medium having computer readable program code disposed therein to effect providing power to said first battery-backup assembly for said first period of time further comprises computer readable program code to effect providing power to said first battery-backup assembly for said first time interval; and wherein said computer useable medium having computer readable program code disposed therein to effect providing power to said second battery-backup assembly for said second period of time further comprises computer readable program code to effect providing power to said second battery-backup assembly for said second time interval.

9. A computer program product encoded in an information storage medium and usable with a programmable computer processor to supply power from a first power supply and a second power supply interconnected to a power bus to a first controller a first controller comprising one or more host adapters, one or more device adapters, a processor, cache, memory, and a Fibre Channel switch, and having a first controller load, a second controller comprising one or more host adapters, one or more device adapters, a processor, cache, memory, and a Fibre Channel switch, and having a second controller load, a first battery-backup assembly having a first BBU load, and a second battery-backup assembly having a second BBU load, wherein said first battery-backup assembly is external to and interconnected with said first controller and wherein said second battery-backup assembly is external to and interconnected with said second controller, comprising:

computer readable program code which causes said programmable computer processor to provide power to said first controller and to said second controller and to said first battery-backup assembly over a first period of time; and computer readable program code which causes said programmable computer processor to provide power to said first controller and to said second controller and to said second battery-backup assembly over a second period of time, wherein said first period of time interval differs from said second period of time.

10. The computer program product of claim 9, wherein said first power supply is capable of supplying a system load comprising the sum of said first controller load, said second controller load, said first BBU load, and said second BBU load; and wherein said second power supply is capable of supplying a system load comprising the sum of said first controller load, said second controller load, said first BBU load, and said second BBU load.

11. The computer program product of claim 9, wherein said first power supply is capable of supplying a system load comprising the sum of said first controller load, said second controller load, and said first BBU load; and wherein said second power supply is capable of supplying a system load comprising the sum of said first controller load, said second controller load, and said first BBU load.

12. The computer program product of claim 9, wherein said computer program product specifies a first time interval, and a second time interval:

wherein said computer readable program code which causes said programmable computer processor to provide power to said first battery-backup assembly for said first period of time further comprises computer readable program code which causes said programmable computer processor to provide power to said first battery-backup assembly for said first time interval; and wherein said computer readable program code which causes said programmable computer processor to provide power to said second battery-backup assembly for said second period of time further comprises computer readable program code which causes said programmable computer processor to provide power to said second battery-backup assembly for said second time interval.

* * * * *